United States Patent
Platt

[15] 3,660,874
[45] May 9, 1972

[54] PIN FASTENER

[72] Inventor: Marden G. Platt, 319 Willett Avenue, Riverside, R.I. 02915

[22] Filed: Feb. 24, 1970

[21] Appl. No.: 13,693

[52] U.S. Cl.................................24/162, 24/160, 24/103, 24/13
[51] Int. Cl..........................................A44c 1/00
[58] Field of Search..................24/103, 160, 162, 150 R, 13

[56] References Cited

UNITED STATES PATENTS

| 44,031 | 8/1864 | Wanner | 24/160 |
| 156,721 | 11/1874 | Young | 24/103 |
| 246,247 | 8/1881 | Türpisch | 24/103 |
| 699,436 | 5/1902 | Ayers | 24/103 |
| 1,418,222 | 5/1922 | Zeller | 24/103 UX |

Primary Examiner—Bobby R. Gay
Assistant Examiner—Peter A. Aschenbrenner
Attorney—Chittick, Pfund, Birch, Samuels & Gauthier

[57] ABSTRACT

A pin fastener which utilizes both sliding and rotational movement of a pin element to close and open the fastener. The preferred embodiment comprises a generally circular elongated pin supporting member having raised, spaced end portions which form a pin receiving opening through which the pin portion of the fastener can be rotated. The pin element itself is mounted on the support member in a manner to permit both sliding movement along and rotational movement about the longitudinal axis of the pin supporting member. The closing and opening operations are both accomplished by moving the pin element through a rotational-sliding-rotational sequence.

5 Claims, 7 Drawing Figures

PATENTED MAY 9 1972

3,660,874

INVENTOR.
MARDEN G. PLATT
BY
Chittick, Pfund, Birch, Samuels & Gauthier

PIN FASTENER

BACKGROUND OF THE INVENTION

This invention relates to fasteners in general and, more particularly, to a pin fastener which employs a pin element that is free to move rotationally about as well as slidably along an elongated pin supporting member.

The art of pin type fasteners is quite old and well developed. The classification of pin type fasteners in the U.S. Patent Office is divided, inter alia, into pin elements, Class 24, Sub-Class 160 and sliding pin elements Class 24, Sub-Class 162. Representative examples of early pivoted pin fasteners include the following U.S. Pat. Nos: Wanner, No. 44,031 issued Aug. 30, 1864; Turpisch, No. 246,247 issued Aug. 23, 1881; and, Hatten, No. 594,532 issued Nov. 30, 1897. Similar examples of sliding pin type fasteners are also well known to those in the art. However, the effective combination of both sliding and rotational movement of the pin element for opening and closing pin type fastener appears novel in the art. Although the Turpisch patent cited above does mention that the pivoted portion of the pin element can slide, the distal or fabric puncturing portion of the Turpisch pin element is tightly constrained between a cap and the ends of the brooch. This configuration suffers from a number of disadvantages including the inability to position or rotate the pin or brooch after the pin element has been placed through the underlying fabric and closed.

It is accordingly a general object of the present invention to provide a pin fastener which utilizes both rotational and sliding movement of the pin element to open and close the fastener.

It is a specific object of the invention to provide a pin fastener which has multiple functionality as a decorative item of jewelry, as a fastener, and as a removable base for ornamental items such as medals, ribbons, insignia and the like.

It is another object of the invention to provide a pin fastener that can be easily fabricated from a variety of inexpensive materials.

It is still another object of the invention to provide a pin fastener in which the pin supporting member can be moved after the pin element has been secured to the underlying fabric or material.

It is a feature of the invention that only two relatively movable components are required to construct the preferred embodiment of the invention.

These objects and other objects and features of the invention will be best understood from a detailed description of a preferred embodiment thereof, selected for purposes of illustration, and shown in the accompanying drawings in which.

Figure 1:
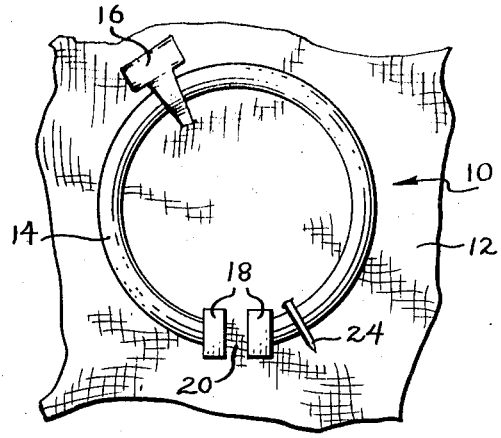
FIG. 1 is a plan view of the pin fastener of the present invention showing the fastener secured to a piece of fabric.

Turning now to the drawings, and particularly to FIG. 1 thereof, there is shown in plan view a pin fastener constructed in accordance with the present invention and indicated generally by the reference numeral 10. The pin fastener 10 is illustrated in FIG. 1 in its closed position secured to a piece of fabric or other material 12.

The pin 10 comprises two relatively movable components shown, generally in FIG. 1 and in greater detail in FIGS. 2 through 5. The two components of the pin fastener 10 are an elongated element 14 which forms a support for the second component, a rotatable and slidable pin element 16. In the preferred embodiment of the invention, the elongated element 14 is shaped to form the generally circular pin supporting member illustrated in FIGS. 1, 2, 4 and 5. The ends of the elongated pin supporting member 14 terminate in two raised pin securing members 18. Looking at FIGS. 1 and 2, it can be seen that the ends of the elongated member 14 are spaced apart and define a pin receiving opening or passage 20.

The pin element 16 is mounted on the elongated pin supporting members 14 to provide both rotational movement about and opening and closing sliding movement along the longitudinal axis of member 14. The amount of the rotational movement of the pin element 16 is determined by the configuration of the pin aperture 22 and the cross-sectional configuration of the pin supporting member 14. Looking at FIG. 5, it can be seen that the relative shapes and sizes are designed so that the pin 16 can be raised sufficiently to clear the top surface of the raised end portions 18 as viewed in FIG. 5. Similar angular rotation is also possible in a downwardly direction, as viewed in FIG. 5, to permit the fabric puncturing tip 24 of the pin element 16 to penetrate into and out of the fabric 12.

Figure 2:
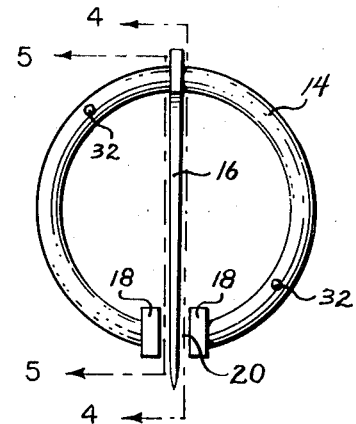
FIG. 2 is a plan view of the pin fastener showing a slightly modified pin configuration.
Figure 5:
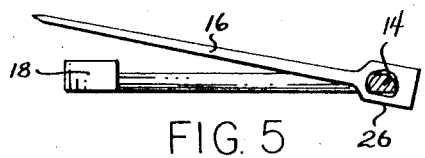
FIG. 5 is a view in cross-section taken along line 5—5 in FIG. 2 showing the rotation of the pin element about the pin supporting member.

The operation of attaching the pin 10 to fabric 12 and then closing the pin to secure it to the fabric can best be understood by referring to FIGS. 1, 2 and 5 of the drawings. The pin element 16 is moved along the longitudinal axis of the pin supporting member 14 until it is aligned with the pin receiving opening 20 as shown in FIG. 2. The pin element 16 is then rotated downwardly through the opening 20 so that the pin can be inserted into the fabric and then out of the fabric. The portion of the pin element 16 projecting out of the fabric (identified by the reference numeral 24 in FIG. 1) is lifted back up through the pin receiving opening 20 and then, the pin is moved along the longitudinal axis of the elongated pin supporting member 14 until the pin tip portion 24 laterally clears one of the raised end portions 18. At this point, the pin is rotated downwardly until the pin tip portion 24 touches the top surface of the pin supporting member 14 as shown in FIG. 1.

It can be seen by inspecting FIGS. 1, 2, 4 and 5, that the depth of the shoulder portion of the raised end portions 18 is sufficient to prevent the pin element 16 from sliding in the pin opening direction without first rotating the pin element in an upwardly direction. In other words, looking at FIG. 1, the pin 10 cannot be opened merely by rotating the pin 16 in a clockwise direction. To open the pin, the pin element tip portion 24 must be lifted above the top of the raised end portions 18 by rotating the pin element 16 about the longitudinal axis of the elongated supporting member 14. With the pin raised above the end portions 18, the entire pin 16 can then be rotated in a clockwise direction until the pin is aligned with the pin receiving opening 20 as illustrated in FIG. 2. Removal of the pin from the fabric is then accomplished by pressing the pin downwardly through the pin receiving opening 20 and then pulling the pin from the fabric.

It will be appreciated that both the opening and closing operations of the preferred embodiment of the pin fastener 10 shown in FIG. 1 are accomplished by performing a movement sequence comprising rotational, sliding and rotational movement. The direction of the sliding motion along the longitudinal axis of the pin supporting member 14 can be either clockwise or counterclockwise for either the opening sequence or the closing sequence depending upon the initial movement direction selected by the user.

Figure 3:
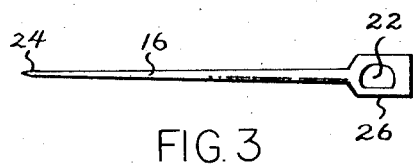
FIG. 3 is a view in side elevation of the pin element shown in FIG. 2.
Figure 4:
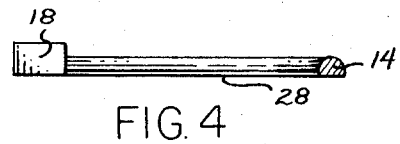
FIG. 4 is a view in cross-section taken along line 4—4 in FIG. 2 showing the pin supporting member and the raised end portions thereof.

Since the pin fastener 10 will normally be resting on a relatively flat fabric surface, the fabric contacting surfaces 26 and 28 of the pin 16 and elongated member 14, respectively, are substantially planar. Looking at FIG. 4, it can be seen that the elongated pin supporting member 14 has a semi-circular configuration in transverse cross-section. The corresponding outer surface 26 of the pin 16 is also flat as shown in FIGS. 3 and 5. Thus, when the pin fastener 10 is in the closed position as depicted in FIG. 1, the pin surface 26 and pin supporting member surface 28 will be substantially co-planar and lie flat against the surface of the fabric 12.

Although in the preceding discussion of the preferred embodiment of the present invention the elongated pin supporting member 14 has been described as having two spaced ends, it will be appreciated that the sliding and rotational concept of the present invention can be implemented even if the ends of the pin supporting member 14 are in contact provided that they can be moved apart to permit passage of the pin element 16 between and beyond the ends 18. In this configuration, the ends of the elongated pin supporting member 14 should be resiliently urged together. While the pin fastener 10 can be fabricated from a number of materials including metal and plastic, plastic is preferred because of its molding ease, low cost and ability to provide the required resiliency for the closed end version of the pin fastener.

The basic concept of the present invention which utilizes both rotational and sliding movements of the pin element to accomplish both the opening and closing of a pin type fastener can be physically structured in a variety of ways. Looking at FIGS. 6 and 7, there is shown a generalized version of the present invention. The pin fastener 10 illustrated in FIG. 6 comprises a pin supporting member 14 having at least a portion thereof elongated, as identified by the reference numeral 14a. The pin element 16 is mounted on the elongated portion 14a of the supporting member 14 for closing and opening sliding movement along and rotational movement about the longitudinal axis of the elongated portion. A stop member 34 is provided at one end of the elongated portion 14a to prevent the accidental loss of the pin element 16.

Figure 6:
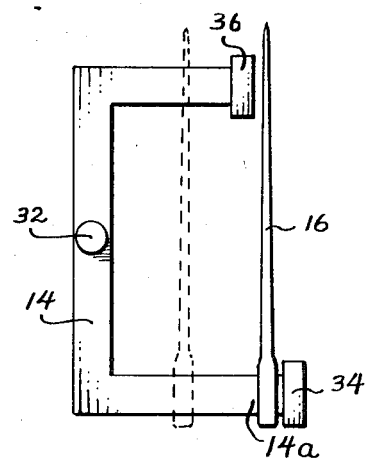
FIG. 6 is a plan view of an alternative embodiment of the pin fastener of the present invention; and, FIG. 7 is an enlarged view in side elevation showing the raised end portion of the pin supporting member illustrated in FIG. 6.
Figure 7:
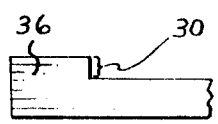

Although the supporting member 14 is shown in "C" configuration in FIG. 6, it will be appreciated that a number of other configurations can be used as long as the shape permits a pin closing means 36 to be positioned on the supporting member 14 at a location near the distal end of the pin element 16. The closing means 36 has a shoulder 30, as shown in FIG. 7, of sufficient depth to prevent the pin element 16 from sliding to the open position without first rotating the pin element about the longitudinal axis of the elongated portion 14a. Thus looking at FIG. 6, it can be seen that if the pin 16 is rotated upwardly from the plane of the drawing and then moved laterally to the left to the position indicated by the dotted lines and then rotated downwardly to contact the pin supporting member 14, the pin element 16 will strike the shoulder of the closing means 36 if the pin is moved in the opening direction to the right. The opening and closing sequence for the pin fastener configuration shown in FIG. 6 is the same as that previously described in conjunction with the pin configuration shown in FIGS. 1 through 5.

It has already been mentioned that the pin fastener 10 can be multi-functional, as a decorative piece of jewelry, as a fastener and as a removable base for ornamental items such as medals, ribbons and the like. In order to simplify the attachment of ornamental objects to the pin fastener 10, the fastener is preferably provided with a threaded element 32 mounted on the pin supporting member 14. Of course other types of fastening elements can be mounted on the elongated member 14 to removably or permanently mount ornamental objects and similar devices.

Having described in detail a preferred embodiment and a number of variations thereof, what I claim and desire to protect by Letters Patent of the United States is:

1. A pin fastener comprising:
   a circular elongated element shaped to form a pin support with the ends of said element being spaced apart and defining a pin receiving passage;
   a pin element one end of which is mounted on said circular elongated element for closing and opening sliding movement along and having means for providing limited rotational movement about the longitudinal axis of said circular elongated element; and,
   means at each end of said circular elongated element for blocking said pin element when the distal end thereof is rotated through said pin receiving passage and moved beyond the blocking means by sliding the pin element along the longitudinal axis of said circular elongated element.

2. The pin fastener of claim 1 further characterized by said pin element blocking means comprising a raised member on each end of the elongated element, said raised members each having a shoulder of sufficient depth to prevent opening sliding movement of said pin element without first rotating said pin element upwardly to clear said shoulder.

3. The pin fastener of claim 1 further characterized by said elongated element having a semi-circular configuration in transverse cross-section and said pin element having a flat outer surface beneath the flat portion of said elongated element so that when the pin fastener is closed, the pin element and the elongated pin support element define two substantially co-planar surfaces.

4. The pin fastener of claim 1 further characterized by means mounted on said pin supporting member for removably holding an ornamental object.

5. A pin fastener comprising:
   a circular elongated element shaped to form a pin support with the ends of said element being resiliently urged together;
   a pin element one end of which is mounted on said circular elongated element for closing and opening sliding movement along and having means for providing limited rotational movement about the longitudinal axis of said circular elongated element; and
   means at each end of said circular elongated element for blocking said pin element when the distal end thereof is rotated between and beyond said resiliently urged together ends of the elongated element and then moved beyond the blocking means by sliding the pin element along the longitudinal axis of said circular elongated member.

* * * * *